US011226988B1

(12) United States Patent
Baldwin et al.

(10) Patent No.: US 11,226,988 B1
(45) Date of Patent: *Jan. 18, 2022

(54) GENERATING EVENT SUGGESTIONS FOR USERS FROM SOCIAL INFORMATION

(71) Applicant: Facebook, Inc., Menlo Park, CA (US)

(72) Inventors: Robert Michael Baldwin, San Francisco, CA (US); Henry Bridge, Brooklyn, NY (US); Omid Aziz, Brooklyn, NY (US); Devin Naquin, Driftwood, TX (US)

(73) Assignee: Meta Platforms, Inc., Menlo Park, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/513,595

(22) Filed: Jul. 16, 2019

Related U.S. Application Data

(63) Continuation of application No. 13/627,774, filed on Sep. 26, 2012, now Pat. No. 10,402,426.

(51) Int. Cl.
G06F 17/00 (2019.01)
G06F 7/00 (2006.01)
G06F 16/28 (2019.01)
G06F 16/9535 (2019.01)
G06Q 50/00 (2012.01)

(52) U.S. Cl.
CPC ........ G06F 16/284 (2019.01); G06F 16/9535 (2019.01); G06Q 50/01 (2013.01)

(58) Field of Classification Search
CPC .... G06F 16/284; G06F 16/9535; G06Q 50/01
USPC ...................................................... 707/748
See application file for complete search history.

(56) References Cited

U.S. PATENT DOCUMENTS

| 7,827,208 | B2 | 11/2010 | Bosworth et al. |
| 8,108,414 | B2 | 1/2012 | Stackpole |
| 8,171,128 | B2 | 5/2012 | Zuckerberg et al. |
| 8,234,285 | B1 * | 7/2012 | Cohen ................... G06F 16/334 707/749 |
| 8,688,980 | B2 | 4/2014 | Davis et al. |

(Continued)

OTHER PUBLICATIONS

Mislove, A. et al., "You Are Who You Know: Inferring User Profiles in Online Social Networks," Proceedings of the Conference on Web Search and Data Mining '10, Feb. 4-6, 2010, pp. 251-260, New York, New York, USA.

(Continued)

Primary Examiner — Pavan Mamillapalli
(74) Attorney, Agent, or Firm — Fenwick & West LLP

(57) ABSTRACT

A social networking system suggests events for a target user based on stored data in the social networking system related to the target user and to events. The social networking system may suggest events based on the target user's affinity for, connections with, or interactions with objects in the social networking system connected to or otherwise associated with the events. For example, an event is suggested to a target user if users connected to the target user already accepted an invitation to the event. As another example, an event organized by a particular entity is suggested to the target user because of interactions between the target user and other content provided by the entity. Invitations to suggested events may be presented to the target user via a client device, allowing the target user to easily join a suggested event.

20 Claims, 4 Drawing Sheets

(56) References Cited

U.S. PATENT DOCUMENTS

| | | | |
|---|---|---|---|
| 8,700,644 B1* | 4/2014 | Allen | G06F 16/337 |
| | | | 707/754 |
| 8,938,411 B2 | 1/2015 | Lessin et al. | |
| 9,178,933 B1* | 11/2015 | Soland | H04L 67/18 |
| 9,196,008 B2 | 11/2015 | Baldwin et al. | |
| 9,219,704 B2 | 12/2015 | Hamlin et al. | |
| 9,262,791 B2 | 2/2016 | Garcia-Martinez et al. | |
| 9,318,108 B2* | 4/2016 | Gruber | G10L 21/06 |
| 9,774,556 B2 | 9/2017 | Baldwin et al. | |
| 9,779,385 B2 | 10/2017 | Rajaram | |
| 2003/0074353 A1* | 4/2003 | Berkan | G06F 16/3344 |
| 2006/0129551 A1* | 6/2006 | Teicher | G06Q 10/02 |
| 2006/0143214 A1* | 6/2006 | Teicher | G06Q 30/02 |
| 2007/0233582 A1* | 10/2007 | Abhyanker | H04L 51/04 |
| | | | 705/28 |
| 2008/0071775 A1 | 3/2008 | Gross | |
| 2008/0154696 A1 | 6/2008 | Spiegelman et al. | |
| 2008/0215426 A1* | 9/2008 | Guldimann | G06Q 30/02 |
| | | | 705/14.61 |
| 2010/0030770 A1* | 2/2010 | Cao | G06F 16/3344 |
| | | | 707/708 |
| 2010/0063993 A1 | 3/2010 | Higgins et al. | |
| 2010/0076850 A1 | 3/2010 | Parekh et al. | |
| 2010/0082360 A1 | 4/2010 | Chien et al. | |
| 2010/0106573 A1 | 4/2010 | Gallagher et al. | |
| 2010/0203876 A1 | 8/2010 | Krishnaswamy | |
| 2010/0274815 A1 | 10/2010 | Vanasco | |
| 2010/0331146 A1 | 12/2010 | Kil | |
| 2011/0022602 A1 | 1/2011 | Luo et al. | |
| 2012/0011204 A1 | 1/2012 | Morin et al. | |
| 2012/0066053 A1 | 3/2012 | Agarwal | |
| 2012/0084160 A1 | 4/2012 | Badros et al. | |
| 2012/0110071 A1 | 5/2012 | Zhou et al. | |
| 2012/0124479 A1 | 5/2012 | Morin et al. | |
| 2012/0124508 A1 | 5/2012 | Morin et al. | |
| 2012/0166532 A1 | 6/2012 | Juan et al. | |
| 2012/0239486 A1 | 9/2012 | Hu et al. | |
| 2012/0278262 A1 | 11/2012 | Morgenstern et al. | |
| 2012/0278317 A1 | 11/2012 | Spiegel | |
| 2013/0080524 A1 | 3/2013 | Rubinstein et al. | |
| 2013/0132194 A1 | 5/2013 | Rajaram | |
| 2013/0137464 A1* | 5/2013 | Kramer | G06Q 30/0261 |
| | | | 455/456.3 |
| 2013/0159220 A1 | 6/2013 | Winn et al. | |
| 2013/0212173 A1 | 8/2013 | Carthcart et al. | |
| 2013/0268973 A1 | 10/2013 | Archibong et al. | |
| 2013/0304685 A1 | 11/2013 | Kurata et al. | |
| 2013/0317874 A1 | 11/2013 | Kozloski et al. | |
| 2014/0012925 A1 | 1/2014 | Narayanan et al. | |
| 2014/0012926 A1* | 1/2014 | Narayanan | G06Q 50/01 |
| | | | 709/206 |
| 2014/0089320 A1 | 3/2014 | Baldwin et al. | |
| 2014/0304654 A1 | 10/2014 | Gross | |
| 2015/0170045 A1 | 6/2015 | Kirkham et al. | |
| 2017/0124529 A1* | 5/2017 | Narayanan | G06F 16/9535 |

OTHER PUBLICATIONS

United States Office Action, U.S. Appl. No. 13/584,625, dated Mar. 27, 2014, fifteen pages.
United States Patent and Trademark Office, Before the Patent Trial and Appeal Board, Examiner's Answer, U.S. Appl. No. 12/978,265, Apr. 4, 2018, twenty pages.
United States Patent Office, Office Communication re Third-party Submission under 37 CFR 1.290, U.S. Appl. No. 14/722,060, dated Dec. 31, 2015, eight pages.
Australian Government, IP Australia, Patent Examination Report No. 1, Australian Patent Application No. 2013353358, dated May 10, 2016, two pages.
Korea Intellectual Property Office, Office Action, Korean Patent Application No. 10-2015-7017023, dated Jul. 12, 2016, eleven pages.
Korean Intellectual Property Office, Office Action, Korean Patent Application No. 10-2015-7017023, dated Nov. 30, 2016, six pages.
PCT International Search Report and Written Opinion, PCT Application No. PCT/US2013/069855, dated Feb. 26, 2014, twelve pages.
United States Office Action, U.S. Appl. No. 13/584,625, dated Oct. 23, 2014, nine pages.
United States Office Action, U.S. Appl. No. 14/722,060, dated Jan. 17, 2017, seven pages.
United States Office Action, U.S. Appl. No. 14/722,060, dated Jul. 18, 2016, ten pages.

* cited by examiner

GENERATING EVENT SUGGESTIONS FOR USERS FROM SOCIAL INFORMATION

CROSS REFERENCE TO RELATED APPLICATIONS

This application is a continuation of co-pending U.S. application Ser. No. 13/627,774, filed Sep. 26, 2012, which is incorporated by reference in its entirety.

BACKGROUND

This disclosure relates to social networking, and, more specifically, to generating event suggestions for users of a social networking system based on social information.

Social networking systems allow users to create accounts that are tied to their identities. Users of a social networking system may create user profiles that store information that they choose to share with the system. A user's profile may include, for example, information about a user's age, gender, employer, alma mater, and marital status. Social networking systems also allow users to specify connections to other users of the system. The users that are connected to a specific user are called the "connections" or "friends" of a user.

Social networking systems also allow users to create events and to invite their connections, or the general public, to these events. In addition, events may be generated by other entities with information maintained by the social networking system, such as bands and companies, or by the social networking system itself. With large numbers of social networking system users, it is difficult to notify each user of events generated by users and other entities in the social networking system without overloading users with information.

SUMMARY

A social networking system allows its users to form connections with each other to encourage interaction between users. For example, the social networking system allows its users to create and manage events identifying a time and/or a location for groups of users to meet in person. To create an event, a user provides the social networking system with a time and/or a location, as well as a listing of users invited to the event. The social networking system sends invitations to the invited users describing the event and allowing the invited users to indicate whether they will attend the event. To allow a user to identify events that the user is likely to be interested in attending, the social networking system suggests events to the user based on the user's previous interactions with the social networking system.

To suggest events to a target user, the social networking system selects one or more candidate events from event data stored in the social networking system. Various selection criteria may be used to select the candidate events. For example, the target user's connections to objects connected to an event, the target user's availability during times associated with an event, the target user's proximity to a location associated with an event, the target user's similarity to other users attending an event, the target user's affinity for other users attending the event and/or additional information is used to select candidate events. A relevance score is calculated by the social networking system for each of the candidate events and used to select one or more suggested events for the target user. For example, the relevance score is based on the target user's affinity for the candidate events.

The social networking system presents the suggested events to the target user, allowing the target user to indicate that they will attend the suggested events. A description of why a suggested event is suggested for a user may also be presented, providing the user with additional information when determining whether to attend a suggested event. When presenting suggested events, an invitation may also be presented to facilitate the target user joining a suggested event.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system offers its users the ability to communicate and interact with other users of the social networking system. Users join the social networking system and add connections to a number of other users to whom they desire to be connected. Users of the social networking system may provide personal information to the social networking system, which is stored in user profiles. For example, a user may provide age, gender, geographical location, education history, employment history and the like. The data provided by a user may be used by the social networking system, along with other data, to generate useful suggestions for presentation to the user. For example, the social networking system uses the provided data along with other information in the social networking system to suggestions for events for the user to attend based on the user's likely interest in one or more events; the social networking system may send the user with an invitation to a suggested event, allowing the user to easily join the suggested event.

System Architecture

Figure 1:
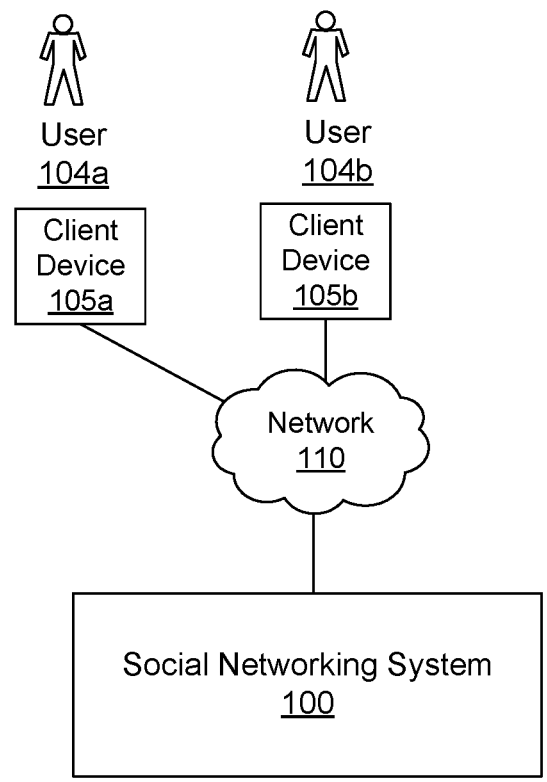
FIG. 1 is a high level block diagram of a system environment in which a social networking system operates in accordance with an embodiment of the invention.

FIG. 1 is a high level block diagram illustrating an embodiment of a system environment for generating event suggestions for social networking system users 104 (also referred to as "users") based on social networking system data. The users 104a and 104b interact with the social networking system 100 using client devices 105a and 105b, which communicate with a social networking system 100 via a network 110.

The client devices 105 comprise one or more computing devices capable of receiving input from the users 104 and transmitting and/or receiving data via the network 110. In one embodiment, a client device 105 is a conventional computer system. In another embodiment, a client device 105 is a device having computer functionality, such as a personal digital assistant (PDA), mobile telephone, smartphone, etc.

A client device 105 may execute an application, for example, a browser application that allows a user 104 of the client device 105 to view information from and provide information to the social networking system 100. In some implementations the client device 105 executes a mobile application (such as an IOS® app or an ANDROID™ app) that allows a user 104 to interact with the social networking system 100. In one implementation client devices 105 receive informative "suggestions" for the users 104 from the social networking system 100, which the users 104 can confirm or deny using a user interface on the client devices 105. For example, a user may receive a suggestion from the social networking system 100 inviting the user to an event that may be of interest to the user; the user may then use an interface on their client device 105 to accept or decline the invitation by communicating with the social networking system 100.

The network 110 enables communications between one or more client devices 105 and the social networking system 100. In one embodiment, the network 110 uses standard communications technologies and/or protocols. Thus, the network 110 may include communication channels using technologies such as Ethernet, 802.11, worldwide interoperability for microwave access (WiMAX), 3G, digital subscriber line (DSL), etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. Data exchanged over the network 110 may be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

Figure 2:
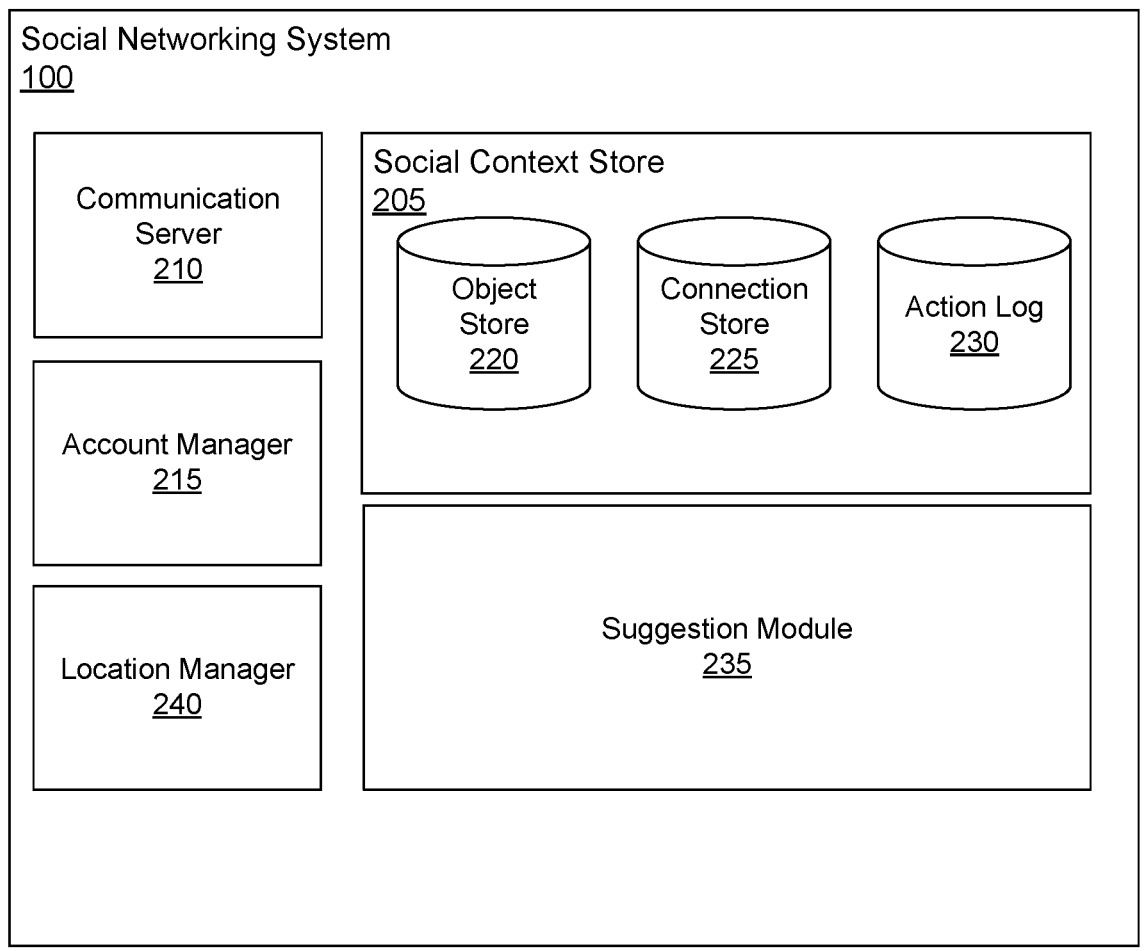
FIG. 2 is a high level block diagram of the components of a social networking system in accordance with an embodiment of the invention.

The social networking system 100 stores information related to users and other entities and provides this information to the users 104 through their client devices 105. FIG. 2 illustrates a more detailed view of the components of one embodiment of the social networking system 100. In the embodiment shown by FIG. 2, the social networking system 100 includes a communication server 210, an account manager 215, a social context store 205, a suggestion module 235, and a location manager 240. Different implementations of the social networking system 100 may use different modules in different combinations and may include other modules.

The communication server 210 links the social networking system 100 via the network 110 to one or more of the client devices 105. Additionally, the communication server 210 provides information from the social networking system 100 to the client devices 105 for presentation to the users 104. The communication server 210 also receives information from the client devices 105 and provides it to components of the social networking system 100.

The account manager 215 authenticates users communicating with the social networking system 100 using the client devices 105. For example, a user 104 provides a user name and password through a client device 105 to the communication server 210. The user name and password are communicated to the account manager 215, which verifies that the user name and password correspond to an account maintained by the social networking system 100.

In one embodiment, the communication server 210 acts as a web server and serves web pages, as well as other web-related content, such as JAVA®, FLASH®, XML, and so forth to the client devices 105 via the network 110. The communication server 210 may also act as an application server and serves application specific data to the client devices 105, such as application-specific JAVASCRIPT® Object Notation (JSON), etc. In some embodiments, the communication server 210 receives standard communication such as e-mails, short message service (SMS) messages, text messages, voice calls, etc., and routes these communications between users of the social networking system 100. The routed communication may be processed and stored by the social networking system 100 in the social context store 250 to provide additional information about social networking system users. The social networking system 100 may include other components to assist in communications such as network interfaces, security mechanisms, load balancers, failover servers, management and network operations consoles, and the like. These are not shown explicitly in FIG. 2.

The social context store 205 stores data related to entities—including users—in the social networking system 100 and the connections between these entities. The social context store 205 includes an object store 220, connection store 225, and an action log 230. However, the social context store 205 may also include other information collected from external feeds, third-party databases, etc. Data from the social context store 205 is used by the suggestion module 235, further described below, to identify events likely to be of interest to a user.

The users and other entities whose information is stored by the social networking system may be represented in the social networking system 100 as objects, which are stored in the object store 220. There may be distinct object types for the different types of entities whose information is stored by the social networking system 100 (e.g. user objects, restaurant objects, event objects, etc.). For example, when a user 104 creates an account on the social networking system 100, a user object may be generated and associated with that user. Similarly, there may be band objects for bands, company or brand objects for corporations, film objects for movies, etc. Each of these object types may store information pertinent to the particular entity being represented. For example, user objects may include gender, age, birthday, etc., while band objects may include album information, song information, tour dates, etc.

The social networking system 100 allows different entities to create event objects that represent events that users may attend. Event objects can be associated with other objects such as user objects, band objects, brand objects, etc. When a user creates an event on the social networking system 100, a corresponding event object is created and associated with a user object associated with the creating user. Different types of events may be created, with different types of event objects used to represent the different types of events and to store information associated with the different types of events. Examples of event types include birthdays, product launches, baby showers, parties, concerts, graduations, etc.

Information received by the communication server 210 may be associated with specific objects in the object store 220 based on the account verification performed by the account manager 215. For example, the account manger 215 authenticates a user 104 that logs into the social networking system 100 and associates the user's activity with the user's user object. If the user subsequently creates an event using the social networking system 100, an event object describing the event is stored in the object store 220 and associated with the user's user object.

The social networking system 100 also tracks connections between the stored objects and stores the connections between objects as connection data in the connection store 225. The connection data (or "connections") represents relationships between objects in the object store 220. For example, if a user indicates that they are a fan of a particular band, a connection is created linking that user's object and the band's object. The connection in this example may have a connection type indicating that the user is "a fan of" the band. The connection store 225 may store a number of different connection types to track a wide variety of relationships between objects in the object store 220.

In one embodiment, the connection store 225 includes connections having different connection types indicating relationships between users and events. For example, different connection types indicate that users are organizers or attendees of an event. These connection types allow the social networking system 100 to efficiently identify users attending an event by identifying users connected to an event object by a specified connection type. Similarly, the organizers for an event can be determined by the social networking system 100 by identifying user objects connected to an event object having a connection type indicating an event organizer.

As a specific example, users 104 John and Joe are represented as two user objects in the object store 220; John creates an event in the social networking system 100 for his birthday party and Joe indicates he will attend the birthday party. When John creates the event, a birthday event object is generated and stored in the object store 220, while a connection between John's user object and the birthday event object having a connection type indicating that John is the "organizer of" the birthday event is created. Similarly, when Joe indicates that he will attend the birthday event, a connection between Joe's user object and the birthday event object is created having a connection type indicating that Joe is an "attendee of" the event.

The social networking system 100 may also store information related to the actions of users and other entities. For example, when the social networking system 100 receives information that a user has taken a particular action, an action object is generated for that action. The action object indicates the type of action taken by the user and the objects related to that action. For example, if a user dines at a particular restaurant, an action object may be generated identifying the user, the restaurant, the time of dining, the other dinner companions etc. The action objects may be logged in the action log 230. The action log 230 may also track the actions taken by users on the social networking system 100, for example sending messages to other users, posting photos, posting comments, etc.

The objects, connections, and actions stored in the social context store 205 may be viewed as a graph, where the objects are nodes and the connections and actions are edges connecting the nodes. This graph is sometimes called a social graph. The social graph may be traversed to discover the relationship between objects stored in the social networking system 100. For example, to determine restaurants visited by a specific social networking system user 104, a node corresponding to the user's user object is identified in the social graph and restaurant objects connected to the user object through edges (actions or connections) indicating that the user has "checked in," "reviewed," "dined at," etc. are identified. Similarly, to determine restaurants visited by the user's friends, additional user objects connected to the user object by edges (connections) indicating a friend relationship are identified; and restaurant objects connected to these additional user objects by certain types of edges are identified. Hence, the social graph may be used to determine the various relationships between different objects maintained by the social networking system 100.

The social networking system 100 may also associate geographical location information with actions, connections, and objects. For example, the communication server 210 receives information from client devices 105 that can be used to determine the locations associated with data in the social networking system 100. The information from the client devices 105 is processed by the location manager 240 and associated with objects, connections, or actions in the social context store 205. For example, if a user creates an event in the social networking system 100 and specifies a location for the event (e.g., an address), this location may be stored with an event object associated with the event.

Locations may also be determined without being directly specified by a user. For example, some client devices 105 have GPS capabilities that may allow the location manager 240 to obtain location information directly from the client devices 105. The location of a client device 105 can be associated with actions performed by a user 104 associated with the client device 105. For example, if a user uploads a picture from a client device 105 that is stored as an object in the social context store 205, the location manager 240 retrieves a location from the client device 105 and associates the location with the object. Similarly, the location of a client device 105 may be used to infer the location of a user 104 associated with that client device 105. The client device location may be associated with a user object in the object store 220 associated with the user 104, and as the location of the client device 105 changes, the location associated with the user object may also be changed. In some implementations, the location associated with the client device 105 may not be received directly as GPS coordinates, but may be inferred by the location manager 240 using other information received by the communication server 210. For example, if a user "checks in" to a location, such as a restaurant, the user's location may be approximated to be the location of the restaurant.

The suggestion module 235 generates suggested actions (suggestions) for users based on data in the social context store 205. The suggested actions are the social networking system's recommendations of actions that are suggested to the user and that may be useful or interesting to be performed by the user. When the user takes a suggested action, the action is recorded in the action log 230 and new connections may be generated in the social networking system based on the action, if appropriate. For example, the suggestion module 235 may determine that a user, Jeff, is likely to be interested in a band, The Stoning Rolls, and presents Jeff with a suggested action to attend a local Stoning Rolls concert based on this determination. In this example, the suggested action may be an invitation to the concert, which is associated with an event object stored in the object store 220. If Jeff accepts the invitation to the concert, such as via a client device 105, the acceptance is communicated back to the social networking system 100, which stores an action in the action log 230 indicating acceptance of the an invitation. In addition, a connection is stored in the connection store 225 linking the user object for Jeff with the event object for the concert and indicating that Jeff is an attendee of the concert.

For clarity, the user for whom a suggested action is generated is called the target user. In the preceding example Jeff is the target user. An event that is suggested to a user is referred to herein as a "suggested event." In the example above the event object for the concert is the suggested event.

For a target user of the social networking system 100, the suggestion module 235 traverses the social graph to identify candidate objects, such as event objects, from which objects relevant to the target user are selected and presented to the target user. Candidate objects may be determined by identifying objects in the social graph that are directly connected to a user object associated with the target user. However, in many cases, the most relevant objects for suggestion generation are not directly connected in the social graph to the user object associated with the target user. Hence, candidate objects are often identified by traversing the social graph to identify candidate objects connected to the user object associated with the target user through intermediate objects. For example, candidate event objects for suggesting to a user may include event objects that are connected to bands, which are connected to songs that are connected to the user.

To better suggest events likely to be of interest to a user, candidate events (or candidate event objects describing candidate events) may be determined based on a measure of their relevance to the target user. This measure of relevance may be computed as an "affinity" score between the candidate objects (e.g., candidate event objects) and the target user. Systems and methods for generating an affinity score between objects in the social networking system 100 are described in U.S. application Ser. No. 12/978,265, filed on Dec. 23, 2010, which is incorporated by reference herein in its entirety.

Figure 3:
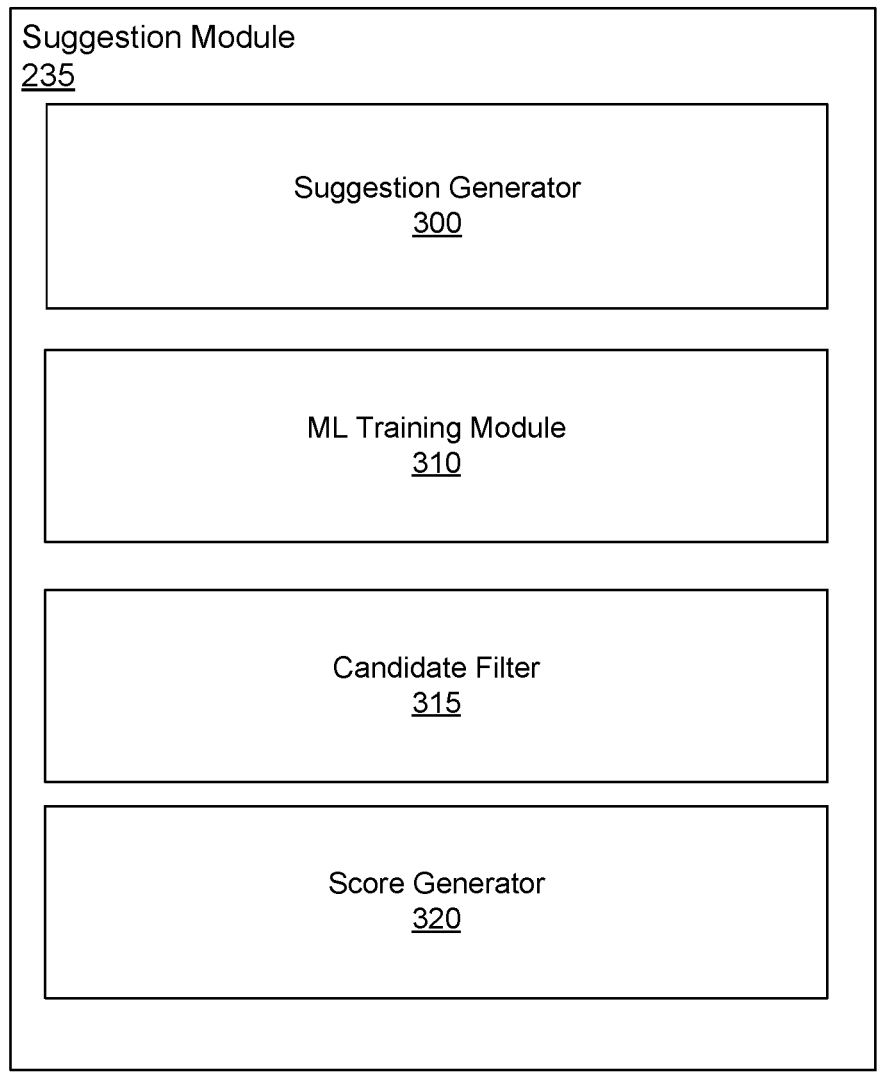
FIG. 3 is a high level block diagram of the components of a suggestion module included in a social networking system in accordance with an embodiment of the invention.

FIG. 3 illustrates one embodiment of the suggestion module 235. In other embodiments the suggestion module 235 may have additional components, or the illustrated components may be combined to provide similar functionality. In the embodiment shown by FIG. 3, the suggestion module 235 includes a suggestion generator 300, a machine-learned (ML) training module 310, a candidate filter 315, and a score generator 320.

The suggestion generator 300 identifies suggested events for a target user to attend based on data in the social context store 205. In various embodiments, the suggestion generator 300 may include different generators configured for suggesting different types of actions in addition to suggesting events; alternatively, the suggestion generator 300 applies various processes to suggest various objects or actions to the target user. For example, various generators may identify different types of suggested actions or objects. Examples of suggested objects include event suggestions, song purchase suggestions, event guest invitation suggestions, friend suggestions, dining suggestions, etc. In one embodiment, the suggestion generator 300 traverses a social graph described by the social context store 205 to identify objects connected to the target user that are used to identify events for suggesting to the target user.

The suggestion generator 300 produces suggestions for the target user by identifying a pool of candidate objects, then scoring the candidate objects to determine candidate objects most relevant to the target user. Based on the scoring, the suggestion generator identifies a subset of the candidate objects to the target user. For example, to suggest events for a target user to attend, the suggestion generator 300 selects a pool of candidate events based on information about the target user and information about various events. Information used for selection of candidate events may include event location, event attendee information, event organizer information, the target user's location, descriptive data associated with the event, the target user's interests, etc. The suggestion generator 300 calculates a score for each of the candidate events based on the target user's characteristics and characteristics of each of the candidate events. The scores provide a measure of how likely the target user would be interested in the various candidate events. In one implementation the candidate events are scored using machine-learned models (discussed in more detail below). Based on the scores associated with the candidate events, a subset of the candidate events are identified and event invitations to the identified subset are sent to the target user. For example, invitations to the highest-scored candidate events are sent or invitations to the candidate events having a score equaling or exceeding a threshold are sent. If the target user accepts an invitation to a suggested event, the acceptance may be used by the suggestion generator 300 to improve subsequent selection of events or other objects.

The score generator 320 generates relevance scores for candidate suggestion subjects. In some embodiments, the relevance scores are generated using a machine-learned model, although other methods may be used. For example, the score generator 320 uses different machine-learned models to generate relevance scores for different types of candidate suggestion objects. The relevance scores are based on attributes of the target user and attributes of the candidate suggestion objects. For example, the relevance score associated with a candidate event is higher if the candidate event is associated with a location within a specified distance of a distance in the target user's user profile, if the descriptive data associated with the event includes one or more interests included in the target user's user profile or if there are other similarities between data associated with the target user and data associated with the candidate event.

The ML training module 310 trains the machine-learned models, or other scoring processes, used by the score generator 320. The ML training module 310 may use different training sets to develop the scoring models for different types of suggested objects produced by the suggestion generator 300. For example, the ML training module 310 uses a training set including historical logs about event attendance by users of the social networking system 100, along with the social information context data for the users and events in those logs to train a scoring model for suggesting events. In this training set, positive training data indicates a user was presented with an event invitation and accepted the event invitation and/or attended the event. The negative training data indicates a user was presented with an event invitation and declined the event invitation and/or skipped the event. Using the training set, the ML training model trains a process used by the score generator 320 to determine a score based on the characteristics associated with a target user and characteristics of candidate events, where the score represents the target user's probability of attending a candidate event or accepting an invitation to the candidate event if the event is suggested to the user. A variety of machine-learned methods may be used to output an accurate relevance score (or probability value), including clustering, neural networks, Bayesian classification, decision-trees, kernel methods, support vector machines, nearest neighbor methods, etc.

As many candidate objects, such as candidate events, may be possible when identifying suggested objects for a target user, it is often useful to reduce the number of candidate objects before scoring. The candidate filter 315 is used to select candidate objects based on one or more criteria to reduce the number of candidate events that are subsequently scored. In one embodiment, the candidate filter 315 uses criteria accounting for attributes of the target user and for attributes of the candidate objects to select candidate objects. For example, if a suggestion generator 300 generates event invitation suggestions for a target user, the candidate filter 315 selects candidate events based on their proximity to the target user, their popularity with the target user's friends (e.g. how many of the target user's friends have accepted an invite, are going to the event, or might go to the event), whether the event is related to the target user's interests, whether the event is of a type that is popular with users that are similar to the target user, or other suitable data.

Generating Event Suggestions

Figure 4:
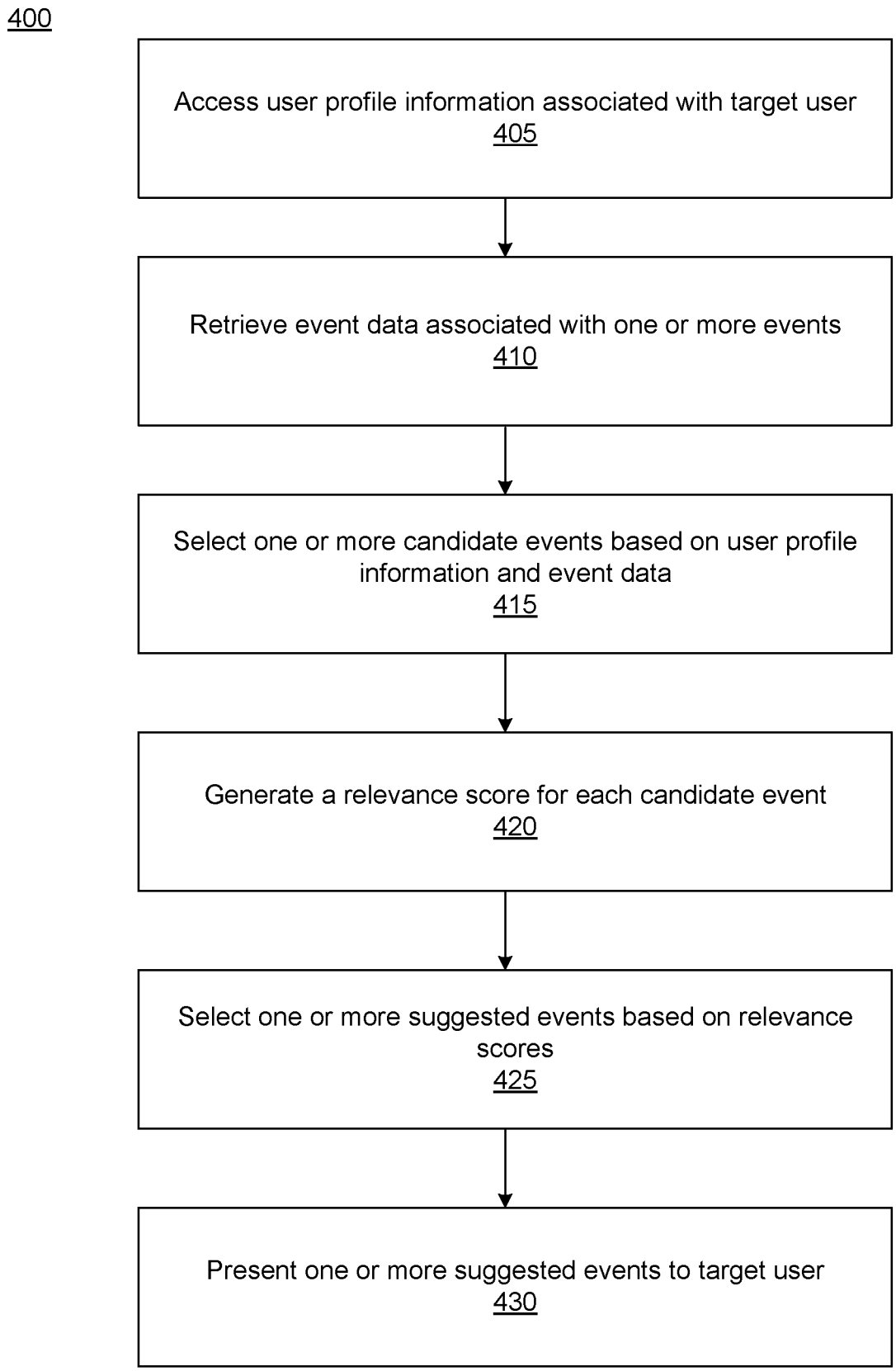
FIG. 4 is a flowchart illustrating a process for generating event suggestions for users of a social networking system in accordance with an embodiment of the invention.

FIG. 4 illustrates one embodiment of a method 400 for suggesting events to a target user in the social networking system 100.

The suggestion module 235 accesses 405 user profile information associated with a target user by the social networking system 100 and stored in the social context store 205. In some implementations the suggestion module 235 may access user profile information associated with many users to identify events for suggesting to many target users. The user profile information, included in a user object associated with the target user, identifies actions performed by the target user as well as other users connected to the target user. The accessed user profile information identifies information about the target user such as gender, interests, location, objects that have been "liked" by the user, songs that have been played by the user, places where the user has checked in, who the user's friends and family are, etc.

The suggestion module 235 also retrieves 410 event data describing one or more events from the object store 220. The event data associated with an event includes one or more of a location, a time, an event name, an event description, an event type, one or more users organizing an event, one or more users attending an event or other information describing characteristics of an event. The event data may be stored as event objects associated with various events. Event data may be obtained by the social networking system 100 in a variety of ways. For example, event data is obtained by other users creating an event, by administrators acting for other entities (such as companies, bands, etc.) creating an event, by automated systems scraping databases or websites to create an event, or by any other suitable method.

A plurality of candidate events are selected 415 based on the user profile information for the target user and characteristics of the retrieved events specified by the event data. The candidate filter 315 selects 415 the candidate events by applying selection criteria to the event data. For example, selection criteria may select 415 events connected to the target user. Examples of selection criteria include: selecting candidate events connected to objects or users for which the target user has a high affinity, selecting candidate events having a description including one or more keywords matching one or more interests of the target user, selecting candidate events organized by an object or user to whom the candidate user has a type of connection or any other suitable information.

For example, a candidate event is selected because the target user is a fan of an entity connected to the event, or because the event is connected to an entity that the target user has "liked." Similarly an event may be selected if it is associated with an object (such as an object representing a band, musician, record label, etc.) that is connected to a media object (such as a song, video, etc.) that has been played, liked, saved, shared, or otherwise acted upon by the target user. Additional examples of selection criteria select a candidate event if the target user is connected to a user organizing or hosting the event or if the target user is connected to one or more other users attending the event. For example, a candidate event is selected if the target user is connected to a threshold number of users attending the event or if users for which the target user has a high affinity are attending the event. The candidate filter 315 also accounts for location when selecting 415 candidate events. A candidate event object may be selected if it is associated with a location (e.g., its venue location) that is within a specified distance of the target user's current location or predicted location at the time of the event.

The candidate filter 315 may cluster the target user with other users of the social networking system to discover additional users similar to the target user. The candidate filter 315 then uses historical data describing events attended by these similar users to select 415 candidate events for the target user. Conversely, the candidate filter 315 compares event data associated with each candidate event with event data associated with events previously attended by the target user and selects 415 candidate events based on their similarity to previously attended events. A machine-learned model may be used in both the clustering and similarity-based selection. The various selection criteria described above may also be combined when selecting 415 events (e.g. selecting musical events close to the target user, attended by her friends).

The score generator 320 generates 420 a relevance score for each of the candidate events. The relevance score associated with a candidate event represents a probability that the target user would accept an invitation to the candidate event. The relevance score may be generated using a machine-learned model that has been trained by the ML training module 310 using historical data about social networking system users' event attendance. The historical data may include information describing past events, including invitations sent to users for those past events, invitation acceptances by users, and invitation refusals by users.

Based on the relevance scores, one or more suggested events are selected 425 from the candidate events and the suggested events are presented 430 to the target user. For example, a description of the suggested events is presented 430 to the target user via a client device 105, allowing the user to interact with the description to accept or reject the suggested events. The description of the suggested events may also describe why an event is suggested to the target user. For example, the description of a suggested concert event includes a message indicating that the concert has been suggested because the target user has frequently listened to music by an artist associated with the concert. As another example, the suggestion module 235 presents 430 the target user with invitations to the suggested events, allowing the user to easily join a suggested event.

When presenting 430 the suggested events to the target user, an interface may also be displayed allowing the target user to customize subsequent event suggestions. The interface may allow the target user to opt out of receiving future event suggestions based on various event attributes, such as type, organizer, keywords, location, etc. Further, the interface may allow the target user to receive additional event suggestions, or to more frequently receive event suggestions, based on different event attributes, such as type, organizer, attendees, location, etc. Data received via the interface is communicated to the social networking system, where the suggestion module 235 uses the data to modify suggestion of events to the target user accordingly.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   accessing user profile information in a social networking system containing information about a target user, wherein the information comprises information relating to the target user's history of attending events;
   retrieving data stored in the social networking system related to a plurality of events, each event associated with at least one of a time, a location, and a description;
   selecting one or more candidate events based on a connection between the target user and the event, using the user profile information relating to the target user and the data related to the plurality of events;
   generating, by a processor, a candidate event relevance score for each candidate event based on the user profile information including the target user's history of attending events and the data associated with the candidate event, the candidate event relevance score associated with each candidate event comprising an estimate of a probability that the target user will attend the candidate event responsive to a suggestion;
   selecting an event from the candidate events based on the candidate event relevance scores; and
   suggesting the selected event to the target user by presenting it to the user in a user interface of the social networking system.

2. The computer-implemented method of claim 1, wherein selecting the one or more candidate events is based in part on an affinity between the target user and the candidate event.

3. The computer-implemented method of claim 1, wherein the relevance score associated with each candidate event is based in part on one or more of: a location associated with the candidate event, a location associated with the target user, a type associated with the candidate event and one or more types of events previously attended by the target user.

4. The computer-implemented method of claim 3, wherein the probability of the target user attending the candidate event is determined at least in part by a comparison between characteristics of the candidate event and characteristics of one or more events previously attended by the target user.

5. The computer-implemented method of claim 1, wherein generating a relevance score associated with each candidate event based on the user profile information and the data associated with the candidate event comprises applying a machine-learned model to the user profile information and to the data associated with the candidate event.

6. The computer-implemented method of claim 5, wherein the machine learned model is trained using historical event data comprising one or more of: data describing characteristics of past events, data identifying responses from users that received an invitation to at least one of the past events.

7. The computer-implemented method of claim 1, wherein selecting one or more candidate events comprises selecting an event connected to an object in the social networking system for which the target user has an affinity score equaling or exceeding a threshold value.

8. The computer-implemented method of claim 1, wherein selecting one or more candidate events comprises selecting an event associated with a location that is within a specified distance of a location associated with the target user.

9. The computer-implemented method of claim 1, wherein selecting one or more candidate events comprises selecting an event associated with an object that is associated with an additional object with which the target user interacted.

10. The computer-implemented method of claim 9, wherein the additional object comprises media content.

11. The computer-implemented method of claim 1, wherein selecting one or more candidate events comprises selecting an event associated with a user organizing the event that is connected to an object stored in the social networking system to which the target user is connected.

12. The computer-implemented method of claim 1, wherein selecting one or more candidate events comprises selecting an event having one or more invited users having a connection to the target user.

13. The computer-implemented method of claim 1, wherein selecting one or more candidate events comprises selecting an event having one or more invited users, the invited users associated with user profile information having characteristics similar to characteristics of the user profile information of the target user.

14. The computer-implemented method of claim 1, wherein selecting one or more candidate events comprises selecting an event having characteristics similar to characteristics of additional events that the target user previously attended.

15. A computer program product comprising a non-transitory computer-readable storage medium containing instructions that, when executed by a processor causes the processor to perform the following steps:
accessing user profile information in a social networking system containing information about a target user, wherein the information comprises information relating to the target user's history of attending events;
retrieving data stored in the social networking system related to a plurality of events, each event associated with at least one of a time, a location, and a description;
selecting one or more candidate events based on a connection between the target user and the event, using the user profile information relating to the target user and the data related to the plurality of events;
generating, by a processor, a candidate event relevance score for each candidate event based on the user profile information including the target user's history of attending events and the data associated with the candidate event, the candidate event relevance score associated with each candidate event comprising an estimate of a probability that the target user will attend the candidate event responsive to a suggestion;
selecting an event from the candidate events based on the candidate event relevance scores; and
suggesting the selected event to the target user by presenting it to the user in a user interface of the social networking system.

16. The computer program product of claim 15, wherein selecting the one or more candidate events is based in part on an affinity between the target user and the candidate event.

17. The computer program product of claim 15, wherein selecting one or more candidate events comprises selecting an event connected to an object in the social networking system for which the target user has an affinity score equaling or exceeding a threshold value.

18. The computer program product of claim 15, wherein selecting one or more candidate events comprises selecting an event associated with a location that is within a specified distance of a location associated with the target user.

19. The computer program product of claim 15, wherein selecting one or more candidate events comprises selecting an event associated with an object that is associated with an additional object with which the target user interacted.

20. The computer program product of claim 15, wherein the relevance score associated with each candidate event is based in part on one or more of: a location associated with the candidate event, a location associated with the target user, a type associated with the candidate event and one or more types of events previously attended by the target user.

* * * * *